US006980651B2

(12) United States Patent
Litwin, Jr. et al.

(10) Patent No.: US 6,980,651 B2
(45) Date of Patent: Dec. 27, 2005

(54) METHOD FOR USING AN ACCESS CARD TO CREATE A SECURE SUB-NETWORK ON A PUBLIC NETWORK

(75) Inventors: Louis Robert Litwin, Jr., Plainsboro, NJ (US); Kumar Ramaswamy, Plainsboro, NJ (US); Michael Arthur Derrenberger, Fishers, IN (US)

(73) Assignee: Thomson Licensing, Boulogne-Billancourt (FR)

( * ) Notice: Subject to any disclaimer, the term of this patent is extended or adjusted under 35 U.S.C. 154(b) by 940 days.

(21) Appl. No.: 09/884,722

(22) Filed: Jun. 19, 2001

(65) Prior Publication Data

US 2002/0191787 A1    Dec. 19, 2002

(51) Int. Cl.$^7$ .............................. H04L 9/00; H04K 1/00
(52) U.S. Cl. ........................ 380/44; 380/255; 713/163; 713/172
(58) Field of Search ............................ 380/28, 44, 277, 380/281, 282, 285; 713/150, 162, 163, 168, 713/172, 173

(56) References Cited

U.S. PATENT DOCUMENTS

| | | | | |
|---|---|---|---|---|
| 4,200,770 A | * | 4/1980 | Hellman et al. | 380/30 |
| 5,604,801 A | * | 2/1997 | Dolan et al. | 713/159 |
| 6,134,326 A | * | 10/2000 | Micali | 380/30 |
| 6,141,750 A | * | 10/2000 | Micali | 713/168 |
| 6,226,383 B1 | * | 5/2001 | Jablon | 380/30 |
| 6,490,680 B1 | * | 12/2002 | Scheidt et al. | 713/166 |
| 6,636,968 B1 | * | 10/2003 | Rosner et al. | 713/178 |
| 6,708,273 B1 | * | 3/2004 | Ober et al. | 713/189 |
| 6,718,467 B1 | * | 4/2004 | Trostle | 713/171 |

OTHER PUBLICATIONS

Diffie et al, "New Directions in Cryptography" Nov. 1976, IEEE Transactions on Information Theory, Col. IT-22, No. 6, p. 644-654.*
Hassler, "Security Fundamentals for E-Commerce", 2001, Artech House Inc., p. 52,53,166,167.*
Steiner et al, "Diffie-Hellman Key Distribution Extended to Group Communication", 1996, ACM, p. 31-37.*
Mayer et al, "Secure Protocol Transformation via "Expansion": From Two-Party to Groups", 1999, ACM, p. 83-92.*
Tuvell, "Challenges Concerning Public-Key in DCE", Dec. 1996, Open Software Foundation, Request for Comments 98.0 p. 1-24.*

* cited by examiner

Primary Examiner—Christopher Revak
(74) Attorney, Agent, or Firm—Joseph S. Tripoli; Joseph J. Laks; Joseph J. Kolodka

(57) ABSTRACT

A method for creating a secure sub-network on a public network that includes a set of devices. The secure sub-network is to include a subset of devices from among the set of devices. An access card is provided having a first private key comprised thereon. The access card is scanned to determine the first private key, by the subset of devices. A master device is determined from among the subset of devices. A second private key is selected and a public key is computed based on the second private key, by the master device. The second private key is only known to the master device. The public key is sent to the set of devices, by the master device. A shared encryption key is computed, and an encryption is requested of any subsequent messages between any of the devices comprising the subset of devices using the shared encryption key.

11 Claims, 2 Drawing Sheets

METHOD FOR USING AN ACCESS CARD TO CREATE A SECURE SUB-NETWORK ON A PUBLIC NETWORK

TECHNICAL FIELD

The present invention relates generally to network security and, in particular, to a method for using an access card to create a secure sub-network on a public network.

BACKGROUND DESCRIPTION

In many applications where a shared communications medium is used, it is often desirable to have the ability to create a secure sub-network of devices. This shared communications medium can be in either a wired or a wireless system. Some examples include a power line modem network where neighbors can see each others machines on the shared power line, an Ethernet network in an office building or dormitory where users can "see" all machines on the network, and a wireless network in a home or office where other wireless users can receive the signals. In order to send private information over such a network, a user would like to identify which machines on the network belong to him and establish a secret shared key among all of these devices which can be used to encrypt further transmissions.

One method for accomplishing this is to imprint each device with a unique ID number. The user can then type in this unique number into a PC on the network and the PC can establish identity via that number. One problem with the above method is that is requires users to record the numbers and type them into a computer. Another problem with the above method is that a neighbor, for example, could visit the user's home and record these numbers, and then enter them into his or her computer to add the devices to his or her network. Finally, the above method requires a computer to be on the network. For a network involving, for example, a stereo and speakers (that transmits audio via either wires or wirelessly), there is no way to enter these numbers into either the stereo or the speakers.

Accordingly, it would be desirable and highly advantageous to have a method for creating a secure sub-network of devices that overcomes the above problems of the prior art.

SUMMARY OF THE INVENTION

The problems stated above, as well as other related problems of the prior art, are solved by the present invention, a method for using an access card to create a secure sub-network on a public network.

According to an aspect of the invention, there is provided a method for creating a secure sub-network on a public network. The public network includes a set of devices. The secure sub-network is to include a subset of devices from among the set of devices. The method comprises the step of providing an access card having a first private key comprised thereon. The access card is scanned to determine the first private key, by the subset of devices. A master device is determined from among the subset of devices. A second private key is selected and a public key is computed based on the second private key, by the master device. The second private key is only known to the master device. The public key is sent to the set of devices, by the master device. A shared encryption key is computed, and an encryption is requested of any subsequent messages between any of the devices comprising the subset of devices using the shared encryption key.

These and other aspects, features and advantages of the present invention will become apparent from the following detailed description of preferred embodiments, which is to be read in connection with the accompanying drawings.

DETAILED DESCRIPTION OF PREFERRED EMBODIMENTS

It is to be understood that the present invention may be implemented in various forms of hardware, software, firmware, special purpose processors, or a combination thereof. Preferably, the present invention is implemented as a combination of both hardware and software, the software being an application program tangibly embodied on a program storage device. The application program may be uploaded to, and executed by, a machine comprising any suitable architecture. Preferably, the machine is implemented on a computer platform having hardware such as one or more central processing units (CPU), a random access memory (RAM), and input/output (I/O) interface(s). The computer platform also includes an operating system and microinstruction code. The various processes and functions described herein may either be part of the microinstruction code or part of the application program (or a combination thereof) which is executed via the operating system. In addition, various other peripheral devices may be connected to the computer platform such as an additional data storage device.

It is to be further understood that, because some of the constituent system components depicted in the accompanying Figures may be implemented in software, the actual connections between the system components may differ depending upon the manner in which the present invention is programmed. Given the teachings herein, one of ordinary skill in the related art will be able to contemplate these and similar implementations or configurations of the present invention.

Figure 1:
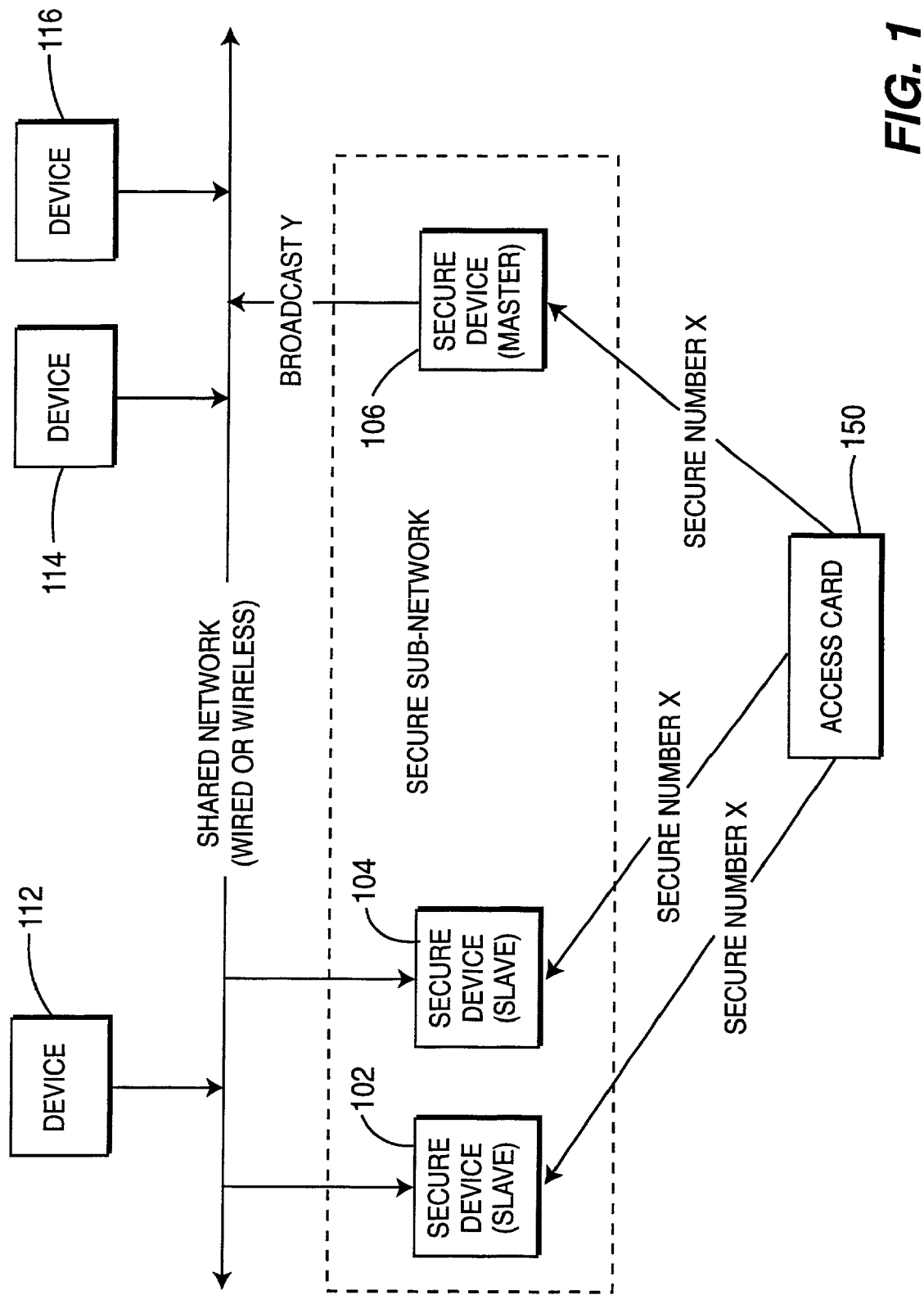
FIG. 1 is a block diagram illustrating a secure sub-network created within a shared, unsecured network using an access card, according to an illustrative embodiment of the present invention.

FIG. 1 is a block diagram illustrating a secure sub-network (hereinafter "sub-network") created within a shared, unsecured network (hereinafter "network") using an access card, according to an illustrative embodiment of the present invention. The sub-network includes a plurality of secured devices 102–106. The network includes a plurality of unsecured devices 112–116. The plurality of secured devices 102–106 include secured devices that are configured as slaves 102–104 and a secured device that is configured as a master 106. The access card 150 is used to create the sub-network as described below.

Figure 2:
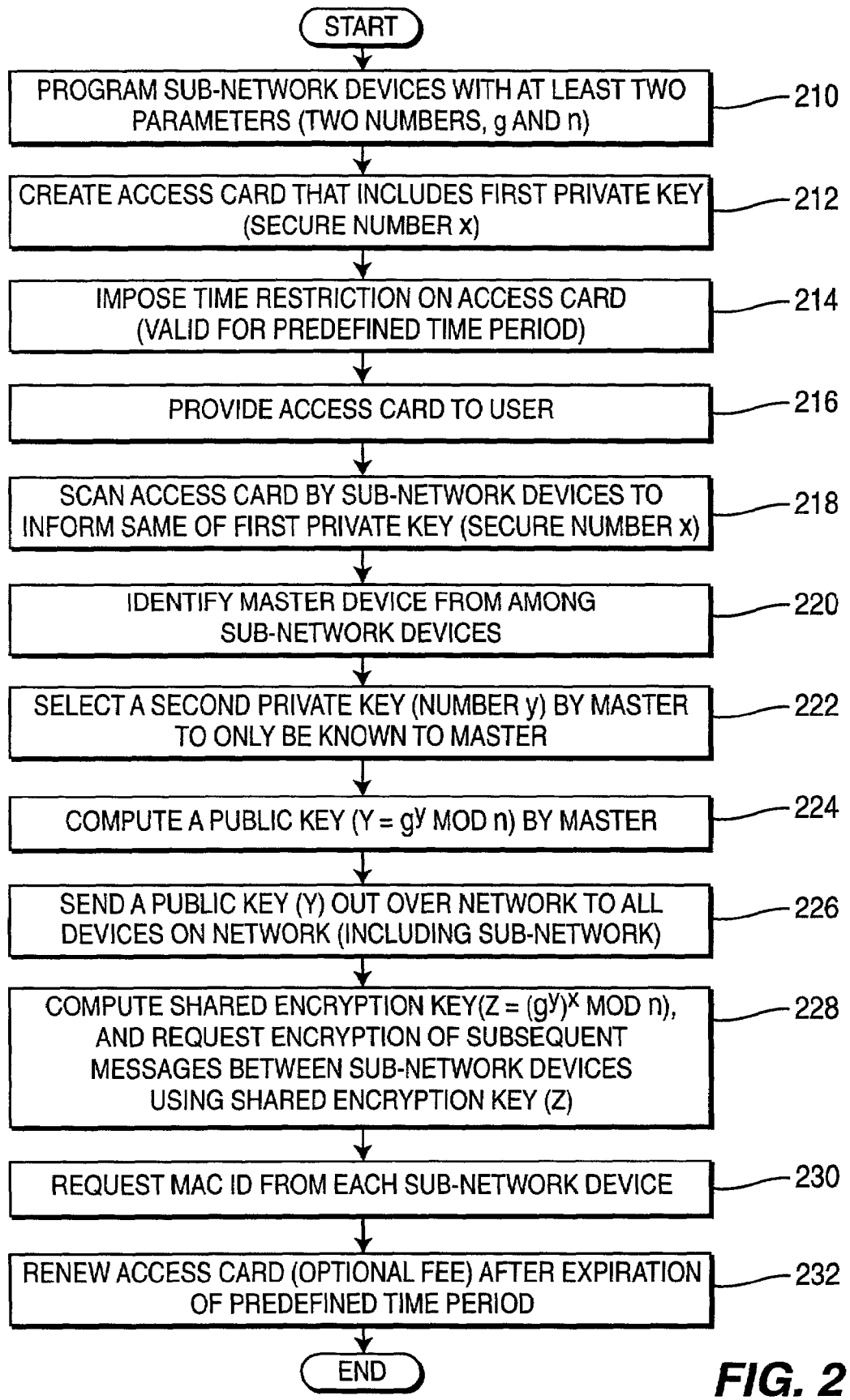
FIG. 2 is a flow diagram illustrating a method for using an access card to create a secure sub-network on a public network, according to an illustrative embodiment of the present invention.

FIG. 2 is a flow diagram illustrating a method for using an access card to create a secure sub-network on a shared, unsecured (public) network, according to an illustrative embodiment of the present invention. The following steps of FIG. 2 are described broadly in terms of public and private encryption keys and a shared encryption key. A more specific embodiment of the present invention is described along with these steps, with the details of the more specific embodiment appearing in parenthesis. Given the teachings of the present invention provided herein, one of ordinary skill in the related art will contemplate these and various other implementations and variations of the present invention, while maintaining the spirit and scope of the present invention. For example, the present invention is not dependent on any specific algorithms, equations, or parameters described herein and, thus, other algorithms, equations, and/or parameters may be readily substituted by one of ordinary skill in the related art, while maintaining the spirit and scope of the present invention.

It is presumed that the devices 102–106 that are to be included in the sub-network are programmed with at least two parameters (e.g., two numbers, g and n) (step 210). Such programming is preferably done by the manufacturers of the devices.

An access card 150 is created that includes a first private key (secure number x) comprised thereon (step 212). The first private key (secure number x) is readable from the access card 150, when the access card 150 is scanned. The access card 150 is used, as described below, to secure the devices 102–106 that are to be included in the sub-network.

Preferably, the access card 150 is a purchasable item. For example, a service provider can generate revenue by providing (selling) access cards. In such a case, the access card 150 may be implemented to only secure the sub-network for a limited time (e.g., several months) and then the service provider would mail out a new access card (for an additional fee). The access card 150 would be valid only when the user is up to date with respect to the payment of any fees associated with the access card 150.

Accordingly, a time restriction is imposed on the access card 150, wherein the access card 150 is valid only for a predefined time period (step 214).

The user is provided with the access card 150 (step 216). The user scans the access card 150 by all the devices 102–106 that are to be included in the sub-network so that only these devices 102–106 (but not the other devices 112–116 on the network that are not to be included in the sub-network) will have knowledge of the first private key (secure number x) (step 218). A master device 106 of the sub-network is identified from among the devices 102–106 that have scanned the access card 150 (step 220). The remaining devices 102–104 that have scanned the access card 150 are considered to be slaves of the master device 106.

The master device 106 will select a second private key (number y) and only the master device 106 will know this second private key (number y) (step 222). The master device 106 will compute a public key ($Y=g^y$ mod n), based upon the second private key (number y) (step 224). The computation of the public key ($Y=g^y$ mod n) may also be based upon the at least two parameters (e.g., two numbers, g and n). Note that the public key is equivalent to exponentiation over a Galois (or finite) field of size n. Although this operation is easy to do, it is very difficult to compute y from Y based on the known mathematical fact that it is difficult to take logarithms over finite fields.

The master device 106 sends the public key (Y) out over the network, and all devices 102–104, 112–116 (the user's and the neighbors) can "hear it" (step 226). The master device 106 then computes a shared encryption key ($Z=(g^y)^x$ mod n), and requests the encryption of any subsequent messages between any of the devices 102–106 comprising the subset of devices (i.e., the devices comprised in the sub-network) using the shared encryption key (Z) (step 228). The master device 106 requests that each device on the sub-network respond with their unique MAC ID number (step 230). As is known, a MAC ID number is a number used to identify a particular device within a network. The MAC ID number is generally "hard-coded" into the device. It is to be appreciated that step 230 may be performed subsequent to step 228 or as part of step 228.

The devices 102–104 of the sub-network will have received $g^y$ from the master device 106, and know the first private key (secure number x) from having scanned the access card 150 at step 214. The master device 106 will be able to decrypt the message since it chose the second private key (number y) itself and it knows the first private key (secure number x) from the access card. Any messages sent by other devices from a different network (as well as messages from devices 112–116 included in the network but not the sub-network) will not know (and, thus, not reference) the first private key (secure number x), and the master device 106 will realize that they are not on the same network (i.e., they are not part of the sub-network). Thus, a sub-network of devices can be secured without mistakenly including (or allowing a hacker to insert) other devices.

Upon the passage of the predefined time period, the validity of the access card 150 expires. The user may then renew the validity of the access card 150 for another predefined time period (step 232). Step 232 may include the payment of a fee.

Although the illustrative embodiments have been described herein with reference to the accompanying drawings, it is to be understood that the present system and method is not limited to those precise embodiments, and that various other changes and modifications may be affected therein by one skilled in the art without departing from the scope or spirit of the invention. All such changes and modifications are intended to be included within the scope of the invention as defined by the appended claims.

What is claimed is:

1. A method for creating a secure sub-network on a public network, the public network including a set of devices, the secure sub-network to include a subset of devices from among the set of devices, said method comprising the steps of:
   providing an access card having a first private key comprised thereon;
   scanning the access card to determine the first private key, by each of the subset of devices;
   identifying a master device from among the subset of devices that have scanned the access card;
   selecting a second private key and computing a public key based on the second private key, by the master device, the second private key only known to the master device;
   sending the public key to the set of devices, by the master device; and
   computing a shared encryption key, sending the shared encryption key to the subset of devices and requesting an encryption of any subsequent messages between any of the devices comprising the subset of devices using the shared encryption key.

2. The method according to claim 1, further comprising the step of programming the subset of devices with at least two parameters, wherein said steps of computing the public key and the shared encryption key are based on the at least two parameters.

3. The method according to claim 1, further comprising the step of requesting a MAC ID from each of the subset of devices, by the master device.

4. The method according to claim 3, further comprising the step of sending a message from at least one device of the subset of devices to at least one other device of the subset of devices, using the MAC ID of the at least other device and the encryption key Z.

5. The method according to claim 1, further comprising the step of imposing a time restriction on the access card, wherein the access card is valid only for a predefined time period.

6. The method according to claim 5, further comprising the step of renewing a validity of the access card subsequent to the predefined time period.

7. The method according to claim 6, wherein said renewing step comprises the step of imposing a fee to renew the validity of the access card.

8. The method according to claim 1, further comprising the step of imposing a time restriction on the access card, wherein the access card is valid only for a predefined time period.

9. The method according to claim 8, further comprising the step of renewing a validity of the access card subsequent to the predefined time period.

10. The method of claim 1, wherein the shared encryption key comprises $Z=(g^y)x \bmod n$.

11. A method for creating a secure sub-network on a public network, the public network including a set of devices, the secure sub-network to include a subset of devices from among the set of devices, the subset of devices being programmed with two numbers g and n, said method comprising the steps of:

providing an access card having a secure number x comprised thereon;

scanning the access card to determine the secure number x, by each of the subset of devices;

identifying a master device from among the subset of devices that have scanned the access card;

selecting a number y and computing $Y=g^y \bmod n$, by the master device, the number y only known to the master device;

sending Y to the set of devices, by the master device; and computing a shared encryption key $Z=(g^y)x \bmod n$, sending the shared encryption key Z to the subset of devices and requesting an encryption of any subsequent messages between any of the devices comprising the subset of devices using the shared encryption key $Z=(g^y)x \bmod n$.

* * * * *